United States Patent [19]

Popov et al.

[11] 4,228,372
[45] Oct. 14, 1980

[54] LINEAR INDUCTION MOTOR

[76] Inventors: Alexandr D. Popov, pereulok Rynochny, 44; Vladimir A. Solomin, ulitsa Dachnaya, 14, kv. 31, both of Rostov-na-Donu, U.S.S.R.

[21] Appl. No.: 966,782

[22] Filed: Dec. 6, 1978

[30] Foreign Application Priority Data

Mar. 20, 1978 [SU] U.S.S.R. .............................. 2587755

[51] Int. Cl.² ........................................... H02K 41/02
[52] U.S. Cl. .................................................... 310/13
[58] Field of Search ..................................... 310/12-14

[56] References Cited

U.S. PATENT DOCUMENTS

| | | | |
|---|---|---|---|
| 3,585,423 | 6/1971 | Bolton et al. | 310/13 |
| 4,049,983 | 9/1977 | Attwood | 310/13 |

*Primary Examiner*—Donovan F. Duggan
*Attorney, Agent, or Firm*—Steinberg and Blake

[57] ABSTRACT

A linear induction motor comprises an inductor with a magnetic core structure formed of first- and second-group laminations and with a polyphase concentrated winding, and a secondary element having an electrically conductive part arranged on a magnetically conductive base. The first-group laminations are extended at right angles to the direction of movement of the inductor and are interconnected by means of the second-group laminations extended in the direction of movement of the inductor. Each first-group lamination has n slots. Rods of the first-group laminations fit tightly in slots of the second-group laminations so that no gaps exist therebetween and toothless active zones are formed in the direction of movement of the inductor, whereas appropriate gaps are provided between the yokes of the first- and second-group laminations. The polyphase concentrated winding includes two groups of coils. The first-group coils of the polyphase concentrated winding are arranged on the yoke of each first-group lamination, while the second-group coils of the polyphase concentrated winding are arranged on the yoke of each second-group lamination. The linear induction motor forming the subject of the present invention features increased tractive force, uniform distribution of magnetizing force within the air gap and enhanced efficiency whereby its operational cost is substantially reduced.

1 Claim, 1 Drawing Figure

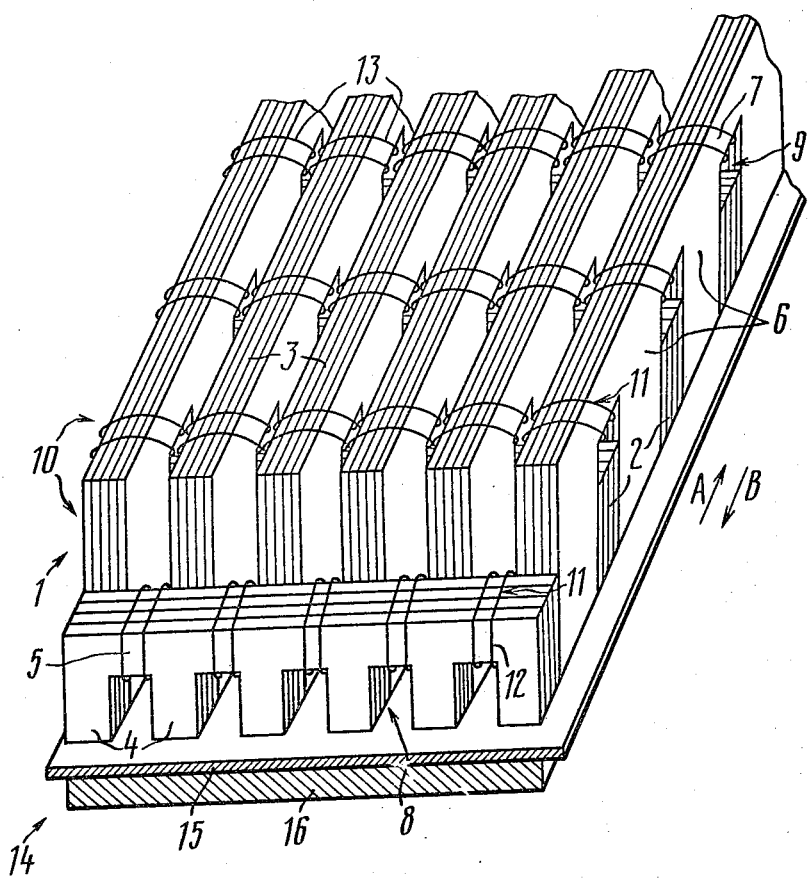

LINEAR INDUCTION MOTOR

FIELD OF THE INVENTION

This invention relates to electrical machines and in particular to linear induction motors.

The linear induction motor forming the subject of the present invention is suitable for use with high-speed ground transport systems. It may also find wide applications in conveyer installations and in various power drives wherein working members perform a rectilinear or reciprocating motion.

DESCRIPTION OF PRIOR ART

Known in the art is a linear induction motor (cf. French Pat. Ser. No. 2,062,622 Cl. HO2K 1971) comprising an inductor with a magnetic core structure formed of a plurality of individual transverse laminations and with a polyphase concentrated winding, and a secondary element formed of an electrically conductive part arranged on a magnetically conductive base, wherein an air gap $\delta$ is provided between the secondary element and the inductor.

The aforesaid linear induction motor develops a relatively low tractive force, its efficiency is inadequate and distribution of magnetizing force within the air gap $\delta$ is nonuniform.

Also known in the art is a linear induction motor (cf. "Construction of Linear Induction Motors with Transversely Closed Magnetic Flux" by A. D. Popov and V. A. Solomin, Central Technical and Economic Research Institute under the Ministry of Communications, Registration No. 663/78) comprising an inductor with a magnetic core structure formed of first- and second-group laminations and with a polyphase concentrated winding having its coils arranged in a plurality of rows, and a secondary element with respect to which the inductor moves. The secondary element has an electrically conductive part arranged on a magnetically conductive base. An air gap $\delta$ is provided between the secondary element and the inductor. Each lamination is formed of rods interconnected by means of a yoke. The first-group laminations having an inverted U-shape configuration are extended transversely of the direction of inductor movement and are interconnected by means of the second-group laminations having m slots and extended in the direction of inductor movement.

The aforesaid linear induction motor develops a relatively low tractive force, its efficiency is inadequate and distribution of a magnetizing force within the air gap $\delta$ between the inductor and the secondary element is nonuniform.

SUMMARY OF THE INVENTION

It is an object of this invention to provide a linear induction motor developing an increased tractive force.

Another object of the invention is to provide a linear induction motor having enhanced efficiency.

A further object of the invention is to provide a linear induction motor wherein distribution of a magnetizing force within an air gap $\delta$ between an inductor and a secondary element is uniform.

The foregoing objects are accomplished by that in a linear induction motor comprising an inductor, having a magnetic core structure formed of a first group of laminations extended at right angles to the direction of movement of the inductor and interconnected by means of a second-group laminations extended in the direction of movement of the inductor, and having a polyphase concentrated winding coils of which are arranged in a plurality of rows, and also comprising a secondary element with respect to which the inductor moves, the secondary element having an electrically conductive part arranged on a magnetically conductive base and each of the laminations of said two groups is formed of respective rods interconnected by means of corresponding yokes, according to the invention, each lamination of said first-group laminations having n slots, one of the extreme first-group laminations having its rods adjacent all the extreme rods of the second-group laminations, arranged in mating relation to the first-mentioned rods, the rods of the other first-group laminations fitting tightly in the slots of the second-group laminations so that no gaps exist therebetween and toothless active zones are formed in the direction of movement of the inductor appropriate gaps being provided between the yokes of said first-group laminations and the yokes of said second-group laminations, the polyphase concentrated winding being composed of two groups of coils, the first-group coils of the polyphase concentrated winding being arranged on the yoke of each first-group lamination and being equal in number to the slots in each first-group lamination, the second-group coils of the polyphase concentrated winding being arranged on the yoke of each second-group lamination and being equal in number to the slots in each second-group lamination.

The linear induction motor forming the subject of the present invention boasts of an increased tractive force, uniform distribution of a magnetizing force within an air gap $\delta$ between an inductor and a secondary element, and enhanced efficiency whereby its operational coast is reduced.

BRIEF DESCRIPTION OF THE DRAWING

The invention will be described in greater detail with reference to a specific embodiment thereof taken in conjunction with the accompanying drawing which shows a linear induction motor according to the invention.

DESCRIPTION OF THE INVENTION

Referring to the drawing the linear induction motor forming the subject of the present invention comprises an inductor 1 having a magnetic core structure formed of laminations 2 of a first group and laminations 3 of a second group. The first-group laminations 2 are formed of rods 4 interconnected by means of yokes 5. The second-group laminations 3 are also formed of rods 6 interconnected by means of yokes 7. The inductor 1 moves along the arrow A.

The first-group laminations 2 are extended at right angles to the direction of movement of the inductor 1 and are interconnected by means of the second-group laminations 3 extended in the direction of movement of the inductor 1. Each first-group lamination 2 has n slots 8, where n is equal to at least 1. In a preferred embodiment of the invention each first-group lamination 2 is provided with five slots 8. Each second-group lamination 3 has the m slots.

One of the extreme first-group laminations 2 has its rods 4 adjacent all the extreme rods 6 of the second-group laminations 3 arranged in mafing relation to the rods 4. The rods 4 of the other first-group laminations 2 fit tightly in the slots 9 of the second-group laminations 3 so that no gaps exist between said rods and the rods 6 of the second-group laminations 3 and toothless active zones are formed in the direction of movement of the inductor 1. The number of the toothless zones is equal to the number of the rods 4 of one first-group lamination 2 (six in a preferred embodiment of the invention).

Appropriate gaps are provided between the yokes 5 of the first-group laminations 2 and the yokes 7 of the second-group laminations 3.

Also, the inductor 1 is provided with a polyphase concentrated winding 10 coils 11 of which are arranged in a plurality of rows. The polyphase concentrated winding 10 is composed of a first group 12 and a second group 13 of the coils 11, said coils 11 of the first group 12 encompassing the yokes 5 of the first-group laminations 2, said coils 11 of the second group 13 encompassing the yokes 7 of the second-group laminations 3, the number of the coils 11 on the yoke 5 of each first-group lamination 2 being five in a preferred embodiment of the invention, the number of the coils 11 on the yoke 7 of each second-group lamination 3 being equal to the number of the slots 9 in each second-group lamination 3.

The proposed linear induction motor also comprises a secondary element 14 with respect to which the inductor 1 moves. The secondary element 14 has an electrically conductive part 15 arranged on a magnetically conductive base 16. An air gap δ is provided between the secondary element and the inductor 1.

The linear induction motor forming the subject of the present invention operates as follows. Connecting the first group 12 and the second group 13 of the coils 11 comprised in the polyphase concentrated winding 10 of the inductor 1 to a three-phase power source sets up a transverse magnetic field travelling along the arrow B, the components of which are closed in a first and a second direction. As the travelling magnetic field crosses the electrically conductive part 15 of the secondary element 14, electromotive forces are induced within the electrically conductive part 15. Threephase eddy currents induced within the electrically conductive part 15 of the secondary element 14 under the action of the aforesaid electromotive forces interact with the travelling magnetic field of the inductor 1 whereby a tractive force and a levitational force (one normal to the plane of the electrically conductive part 15 of the secondary element 14) will be developed. The tractive force causes the inductor 1 to move in the opposite sense to the travelling magnetic field, i.e., along the arrow A.

Since no gaps exist between the rods 4 of the first-group laminations 2 as the former fit tightly in the slots 9 of the second-group laminations 3, toothless active zones are formed in the direction of movement of the inductor 1 and the polyphase concentrated winding 10 is composed of the two groups (12 and 13) of the coils 11 whereby distribution of the magnetizing force will be uniform, i.e., practically sinusoidal distribution of the magnetizing force will be provided within the air gap δ between the inductor and the secondary element 14.

Advantages of the herein proposed linear induction motor are an increased tractive force, enhanced efficiency and uniform distribution of a magnetizing force within an air gap δ between an inductor and a secondary element.

What is claimed is:
1. A linear induction motor comprising:
an inductor;
a magnetic core structure of said inductor;
laminations of a first group of said magnetic core structure of said inductor extended at right angles to the direction of movement of said inductor; a yoke of each of said first-group laminations of said magnetic core structure of said inductor; rods of each said first-group lamination of said magnetic core structure of said inductor interconnected by means of said yoke of each of said first-group laminations of said magnetic core structure of said inductor; each of said first-group laminations of said magnetic core structure of said inductor having n slots;
laminations of a second group of said magnetic core structure of said inductor extended in the direction of movement of said inductor; a yoke of each said second-group lamition of said magnetic core structure of said inductor; rods of each said second-group lamination of said magnetic core structure of said inductor interconnected by means of said yoke of each of said second-group laminations of said magnetic core structure of said inductor; slots in each said second-group lamination of said magnetic core structure of said inductor;
said first-group laminations of said magnetic core structure of said inductor interconnected by means of said second-group laminations of said magnetic core structure of said inductor;
one of said extreme first-group laminations of said magnetic core structure of said inductor having its rods adjacent all the extreme rods of said second-group laminations of said magnetic core structure of said inductor, arranged in mating relation the said first-mentioned rods;
said rods of the other first-group laminations of said magnetic core structure of said inductor fitting tightly in said slots of said second-group laminations of said magnetic core structure of said inductor so that no gaps exist therebetween and toothless active zones are formed in the direction of movement of said inductor; said yokes of said first-group laminations of said magnetic core structure of said inductor so arranged with respect to said yokes of said second-group laminations of said magnetic core structure of said inductor that appropriate gaps exist therebetween;
a polyphase winding of said inductor;
coils of said polyphase concentrated winding of said inductor arranged in a plurality of rows;
a first group and a second group of said coils of said polyphase concentrated winding of said inductor;
said first-group coils of said polyphase concentrated winding of said inductor arranged on said yoke of each said first-group lamination of said magnetic core structure of said inductor, and equal in number to said slots in each said first-group lamination of said magnetic core structure of said inductor;
said second-group coils comprised in said polyphase concentrated winding of said inductor arranged on said yoke of each said second-group lamination of said magnetic core structure of said inductor and equal in number to said slots in each said second-group lamination of said core structure of said inductor;
a secondary element with respect to which said inductor moves;
a magnetically conductive base of said secondary element;
an electrically conductive part of said secondary element arranged on said magnetically conductive base of said secondary element.

* * * * *